INVENTORS
PERCY MATHER
LEV A. MEKLER

Patented Sept. 5, 1944

2,357,531

UNITED STATES PATENT OFFICE 2,357,531

CATALYTIC CONVERSION OF HYDROCARBONS

Percy Mather and Lev A. Mekler, Chicago, Ill., assignors to Universal Oil Products Company, Chicago, Ill., a corporation of Delaware Application August 5, 1939, Serial No. 288,511

4 Claims. (Cl. 196—52)

The invention is more specifically directed to an improved process involving simultaneously conducted endothermic and exothermic reactions.

Hydrocarbons are converted in the endothermic step by passing the same in heated state in contact with a bed of catalytic material which promotes the desired conversion reaction and, in the exothermic step, heavy carbonaceous conversion products deposited on the catalyst particles during the endothermic step are burned therefrom to renew the activity of the catalyst by passing a stream of hot oxygen-containing gases through the catalyst bed.

In many of the processes of commercial significance so far developed for the cataltic conversion of hydrocarbons into products of a more valuable nature, the formation and deposition of hydrocarbonaceous materials in the catalyst bed progresses at such a rate that frequent reactivation of the catalyst is required. It is, therefre, expedient for accomplishing this reactivation in situ (i. e., without removing the bed of catalytic material from the reactor wherein it is disposed and employed to promote the endothermic reaction).

In order to operate continuously and avoid interruption of the desired reactions, it is likewise common practice to employ a plurality of reactors, each containing one or more beds of the catalytic material, with provision for alternating the reactors with respect to the endothermic and exothermic reactions, one or more of said reactors serving as the zone in which conversion of the hydrocarbons is accomplished while the catalytic material in one or more other reactors is being reactivated.

The common expedient for supplying the required heat to the catalyst bed and hydrocarbons undergoing conversion in the endothermic step is to jacket the reactor or provide tubular elements or the like within the catalyst bed, through which jacket or tubular elements a relatively hot convective medium is passed in indirect heat exchange with the catalyst and the reactants. Since burning of the carbonaceous deposits from the catlayst, to accomplish its reactivation, is an exothermic reaction which requires control to prevent excessive heating of the catalyst bed and consequent possible destruction of the catalyst or permanent impairment of its catalytic activity, the same jacket, tubular elements or the like, through which the relatively hot convective medium is circulated during processing of the reactants, is ordinarily employed for circulating a relatively cool convective medium in indirect heat transfer relation with the catalyst, oxidizing gases and the hot combustion products formed during reactivation.

Since relatively large quantities of heat are ordinarily evolved in the exothermic step, it is necessary, for good thermal efficiency, to recover a substantial portion of the available heat in the spent reactivating gases for some useful purpose. In many instances, this available heat will fulfill a major portion of the heat requirements of the endothermic step and its use for this purpose makes for greater economy and a more self-contained process. This has been accomplished in previous systems of this general type by employing the same convective medium for heating in the endothermic step and for cooling in the exothermic step, the conductive medium being circulated, first in indirect heat transfer relation with the catalyst in the reactor wherein reactivation is taking place and then in indirect heat transfer relation with the catalyst in the reactor wherein processing or conversion of the hydrocarbons is taking place.

The present invention follows the above outlined conventional practice with respect to periodic processing of the reactants and reactivation of the catalyst in situ, but involves a decided and advantageous departure from prior practice with respect to the method provided for transferring heat from the exothermic to the endothermic reaction and controlling temperatures in both the endothermic and exothermic steps.

To maintain the hydrocarbon reactants within the temperature range at which their desired conversion will progress satisfactorily during their contact with the catalyst, we employ a plurality of catalyst beds, through which the reactants are passed in series, and heat the reactants prior to their contact with each catalyst bed. The size of each catalyst bed in relation to the volume of hyrocarbon reactants passed therethrough in a given time and the consequent degree of conversion obtained therein is so regulated that the temperature of the reactants, as they are cooled by the heat given up to the endothermic reaction as they pass through the bed, is not reduced to below the optimum range within the catalyst bed. The heat thus lost by the reactants is replaced and the desired higher temperature level reestablished as the reactants pass from each catalyst bed of the series to the next successive bed by reheating the reactants between catalyst beds. This reheating of the reactants is so regulated that their temperature upon entering each catalyst bed does not exceed the optimum range for accomplishing the desired conversion therein. It is within the scope of the invention to employ substantially the same range of temperature within each of the several catalyst beds or to vary the temperatures with respect to the several beds to suit requirements. For example, progressively increasing or progressively decreasing average temperatures may be employed in the successive catalyst beds or conditions may be regulated to establish a predetermined maximum average temperature at an intermediate point in the series of beds.

To transfer substantial quantities of heat from the exothermic to the endothermic step, we employ masses of refractory material, such as ceramics or metals of relatively high heat capacity, through which the hot reactivating gases are passed following each contact thereof with the catalytic material being reactivated, whereby heat is given up from the hot reactivating gases to the refractory mass and stored therein. When the reactor containing the thus heated mass of refractory material is changed over from reactivating to processing service, the reactants to be converted are passed through the mass of hot refractory material prior to their contact with succeeding the catalyst bed and a portion of the heat required for conducting the exothermic reaction is thereby imparted from said heated mass to the reactants by direct contact therebetween.

The endothermic and exothermic steps are seldom in exact thermal balance; i. e., the heat which can be transferred from the exothermic to the endothermic step will not exactly correspond to the heat requirements of the endothermic step. The invention therefore provides for further adjusting the temperature of either the reactants or the reactivating gases, or both, prior to each contact thereof with the successive beds of catalytic material, in addition to the adjustment accomplished by contacting these materials with the refractory material disposed between the successive catalyst beds. This may involve either further heating or partial cooling of the reactants and/or either further cooling or partial reheating of the reactivating gases and adjustment of the temperature of the reactants and/or reactivating gases in either direction is within the scope of the invention. In the instances most commonly encountered, with the type of catalyst, temperature ranges and other operating conditions preferably employed, the reactants will require heating and the reactivating gases will require cooling, in addition to the heating and cooling, respectively, accomplished by their contact with the refractory material.

In addition to the provisions for adjusting the temperature level of the reactants and/or reactivating gases between successive catalyst beds, the invention further provides for controlling the total quantity of heat supplied to the refractory material and stored therein for subsequent use during processing of the reactants, independent of the heat available for this purpose in the hot reactivating gases. It also provides for maintaining the quantity of heat supplied from the refractory material to the reactants and maintaining the temperature at which the reactants are supplied to the catalyst bed substantially uniform during the entire processing cycle in each reactor, regardless of the reduction in the temperature of the refractory mass as the cycle progresses, due to the heat supplied therefrom to the reactants. The method whereby these controls are obtained will be described in conjunction with the accompanying drawings.

The features of the invention relating to the improved method provided for transferring heat from the exothermic to the endothermic reaction and controlling the reaction temperatures in both the endothermic and the exothermic steps are applicable and may be employed to advantage in a wide variety of processes involving simultaneously conducted endothermic and exothermic reactions wherein the endothermic reaction is catalytically promoted and the exothermic reaction comprises reactivation of the catalyst. Catalytic cracking, dehydrogenation, aromatization and cyclization of hydrocarbons exemplify processes of the general type to which the invention is particularly addressed.

Details of the process flow, except as it concerns the general method of temperature control in the reactors, may be varied considerably, within the scope of the invention, for different conversion reactions (the endothermic step) and may also be varied in many well known ways to suit the requirements of different types of charging stock subjected to the same class of conversion reaction. It is, therefore, not intended to limit the invention to the specific process flow illustrated. The illustration is intended, rather, to exemplify certain specific embodiments which illustrate the applicability of the broader features of the invention.

In the accompanying drawings.

Figure 1:
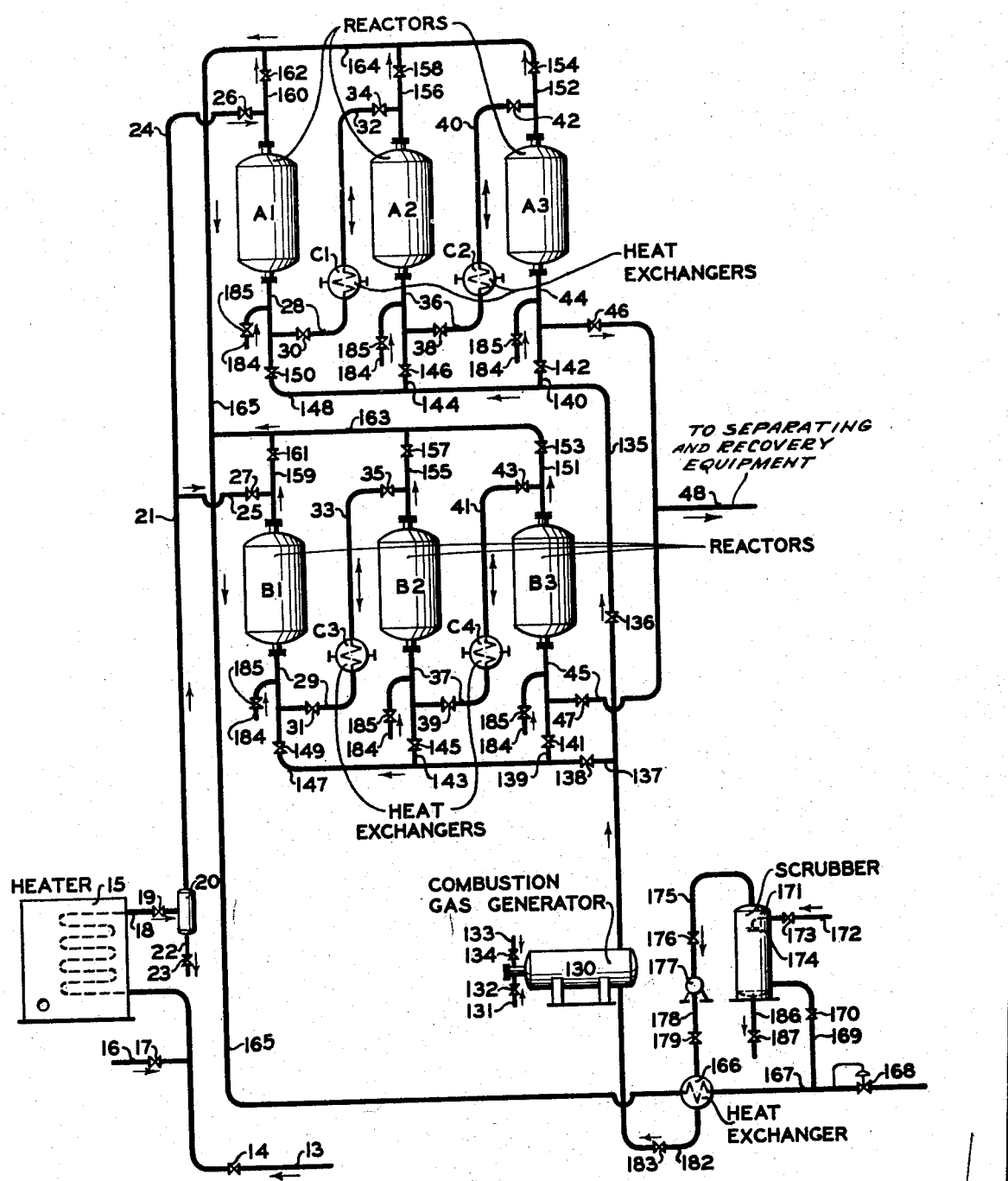
Fig. 1 is essentially a flow diagram of that portion of a catalytic conversion system which embodies the novel and advantageous features of the invention.

Referring to Fig. 1, the process will now be described as applied to the catalytic cracking or reforming of hydrocarbon oils in the system illustrated.

The oil to be converted is supplied, in either cool or preheated state, as desired, through line 13 and valve 14 to heater 15 wherein it is supplied with sufficient heat to effect its substantially complete vaporization at the required pressure, and any desired form of heater capable of accomplishing this may be employed within the scope of the invention. When desired, in order to reduce the effective pressure, assist vaporization and aid in preventing substantial thermal decomposition of the oil, regulated quantities of relatively inert, low molecular weight material such as steam or hydrocarbon gas may be commingled with the oil prior to its introduction into heater 15. Line 16 and valve 17, communicating with line 13, is provided for this purpose in the case here illustrated.

The highly heated and substantially vaporized oil is directed from heater 15 through line 18 and valve 19 to a separator or knock-out drum 20, which may be empty or filled with tar-absorbing or polymerizing materials, wherein any high coke-forming unvaporized fractions of the oil are separated from the relatively clean vapors, the latter being directed from drum 20 through line 21 to the catalytic reactors, as will be later described, while the non-vaporous high coke-forming materials are removed from drum 20 and from the system through line 22 and valve 23 or permitted to deposit on the material within the drum and periodically removed by burning the deposited high coke-forming materials from the absorbent mass or replacing the mass with fresh absorbent material.

In the particular case here illustrated, two sets or groups, A and B, of catalytic reactors are employed, group A consisting of three reactors A1, A2 and A3 and group B consisting of three reactors B1, B2 and B3, the reactors of each group being connected for the series flow of hydrocarbon reactants therethrough and the two groups being connected in parallel. It is, of course, within the scope of the invention to provide any desired number of reactors in each group. Preferably, the reactors are substantially identical and may be of the general form illustrated in Fig. 2 and hereinafter described or of any other suitable form capable of accomplishing the same purpose. In this particular instance, each of the reactors contains a single bed of catalytic material capable of promoting the cracking reaction and of sufficiently small volume in relation to the quantity of vaporous hydrocarbon reactants passed therethrough in a given time that the temperature drop each catalyst bed will not be excessive (i. e., the temperatures prevailing throughout the catalyst beds are within the optimum range for converting the reactants into high yields of the desired products).

Each of the reactors also contains a bed or mass of refractory material of relatively high heat capacity, such as ceramic material or metal which is not adversely affected by and does not adversely affect the reactants or the catalyst. The vaporous hydrocarbon reactants are passed through this mass and heated by contact therewith to the desired conversion temperature prior to their contact with the catalyst.

Each group of reactors is alternately employed for processing the reactants and for reactivation of the catalyst, the refractory material in the reactors of the group in which the catalyst is being reactivated being heated by the hot reactivating gases issuing from the catalyst beds and the recuperative material thus heated during reactivation being subsequently employed in these reactors, during processing, to supply heat to the reactants prior to their contact with the catalyst in each reactor.

When the reactors of group A are employed for heating and processing of the reactants, the latter flow from line 21 through line 24 and valve 26 to reactor A1 wherein they are first heated by contact with the refractory material and then passed through the catalyst bed wherein a portion of the cracking reaction takes place and the temperature of the reactants and resulting conversion products is somewhat reduced. The stream of reactants flow from reactor A1, at the reduced temperature, through line 28 and valve 30 to heat exchanger C1, wherein their temperature is increased as desired and, preferably, to substantially the same temperature as that of the reactants entering reactor A1. The thus reheated reactants pass from C1 through line 32 and valve 34 into reactor A2 wherein further cracking is accomplished in the same manner as in reactor A1. The resulting partially cooled reactants pass through line 36 and valve 38 to heat exchanger C2, wherein their temperature is again increased, as desired, and wherefrom the reheated materials pass through line 40 and valve 42 into reactor A3. The cracking reaction is continued in reactor A3 in the same manner as described with reference to reactors A1 and A2. The resulting conversion products, which are still at a relatively high temperature but somewhat cooler than the stream supplied to reactor A3, are directed from the latter zone through line 44, valve 46 and line 48 to heat recovery, separating and collecting equipment, not illustrated, which may be of any suitable type and form and with which the invention herein claimed is not concerned.

Before the formation and deposition of heavy carbonaceous materials on the catalyst particles has reduced the activity of the catalyst in the reactors of group A to a point where excessive degradation in the yield or quality of products would result, the stream of vaporous reactants is diverted from the reactors of group A and supplied through line 25 and valve 27 to the reactors of group B, wherein the cracking reaction continues while the catalytic material in the reactors of group A is reactivated, as will be subsequently described.

In each of the reactors of group B, conversion and heating of the reactants is accomplished in the same manner as previously described with reference to the reactors of group A, heat exchangers C3 and C4 performing the same function as heat exchangers C1 and C2, the flow of reactants being from reactor B1 through line 29 and valve 31 to head exchanger C3, thence through line 33 and valve 35 to reactor B2, thence through line 37 anad valve 39 to heat exchanger C4, thence through line 41 and valve 43 to reactor B3, the conversion products finally passing from reactor B3 through line 45, valve 47 and line 48 to said heat recovery, separating and collecting equipment, not illustrated.

The intermediate heaters C1, C2, C3 and C4 preferably are substantially identical and may be of any desired form capable of reheating the reactants to the required temperature. In the particular case here illustrated, these heaters are represented as tubular heat exchangers through which a convective medium, such as combustion gases or a liquid or vaporous medium such as a suitable salt, eutectic mixture of salts or low melting point metals or alloys in molten state are passed at the required temperature in indirect heat transfer relation with the reactants. When desired, any other suitable form of heater such as a furnace having a closed coil heated by combustion products generated within the furnace structure or external thereto may be employed within the scope of the invention. However, this latter form of structure, which is capable of functioning efficiently as a heater only, is not preferred when the reactivating gases are passed in series through the reactors, since, in such cases, members C1 to C4 inclusive, in the case here illustrated, function as coolers for the stream of revivifying gases, as will be later explained, when the catalyst beds in the reactors to which they are connected are being reactivated. The use of heat exchangers, which will transfer heat in either direction, therefore obviates the use of separate heating and cooling facilities between the reactors.

In the particular case here illustrated, substantially oxygen-free combustion gases are generated in a closed combustion gas generator 130 by the combustion of fuel and air supplied thereto through lines 131 and 133 containing the respective valves 132 and 134. These freshly generated gases, after mixing in the generator with cooler combustion gases supplied thereto as hereinafter described, are directed through line 135, wherethrough they are supplied to the reactors of group A, when regeneration is taking place in the latter, through valve 136, and to the reactors of group B, when they are being employed for regeneration, through line 137 and valve 138.

The arrangement here illustrated permits the use of either series or parallel flow of the regenerating gases through the reactors in each group. When series flow is employed, the regenerating gases pass through each reactor and through the series of reactors wherein regeneration is taking place in a general direction reverse to that of the flow of reactants therethrough during processing. With parallel flow through the group of reactors undergoing regeneration, the reactivating gases pass through each reactor of the group in a general direction reverse to that of the flow of reactants therethrough during processing.

When the reactors of group A are employed as catalyst regenerating zones and series flow is utilized, the hot combustion gases with which regulated quantities of air are commingled, by introducing the latter into line 44 through line 184 and valve 185, pass into reactor A3 wherein they contact the catalyst mass disposed therein and burn deposited carbonaceous material therefrom. The temperature of the reactivating gases is thereby materially increased and the heated gases then pass through the mass of refractory material disposed in reactor A3 and give up a substantial portion of their heat thereto. The resulting spent and partially cooled reactivating gases are directed from reactor A3 through line 40 and valve 42 to zone C2, which in this case serves as a cooler, whereby the temperature of the gases is further reduced to the desired degree. They then pass through line 36 and valve 38, together with regulated quantities of air admitted through line 184 and valve 185, into reactor A2 wherethrough the flow is the same as that described in conjunction with reactor A3 and wherefrom the partially cooled, spent reactivating gases pass through line 32 and valve 34 to cooler C1 and thence through line 28 and valve 30, together with regulated quantities of air introduced through line 184 and valve 185, into reactor A1. The flow through reactor A1 is the same as that described with reference to reactor A3 and the partially cooled spent reactivating gases are directed from reactor A1 through line 161 and valve 162 into line 165 wherethrough they are directed to heat exchanger 166. Their temperature is further reduced in heat exchanger 166, as will be later explained, and cooled gases from the heat exchanger pass through line 167, line 169 and valve 170 to scrubber 171. The spent and partially cooled reactivating gas stream is intimately contacted in scrubber 171 with a spray of water or an aqueous solution of caustic soda or the like to condense steam formed by the combustion of carbonaceous material in the catalyst beds and remove any undersirable sulfur compounds and the like from the gases. The water or caustic solution is introduced to scrubber 151 through line 172 and valve 173, this line preferably terminating within the scrubber in a suitable spray or the like indicated at 174. The scrubbing material and condensed steam, containing the objectionable compounds removed from the combustion gases, are withdrawn from the lower portion of the scrubber through line 186 and valve 187.

The relatively cool combustion gases leaving scrubber 171 are directed through line 175 and valve 176 to compressor 177 by means of which they are supplied through line 178 and valve 179 to heat exchanger 166. The scrubber combustion gases are partially reheated in heat exchanger 166 by passing therethrough in indirect heat transfer relation with the hot reactivating gases being returned, as previously described, to scrubber 151 and serve to partially cool the latter. The scrubber and partially preheated gases are directed from heat exchanger 166 through line 182 and valve 183 into the combustion gas generator 130 wherein they are commingled with controlled amounts of hot combustion gases freshly generated in this zone to form a mixture of combustion gases at substantially the temperature desired for reactivation of the catalyst. These gases are directed, as previously described, to the group of reactors wherein regeneration is taking place and controlled relatively small amounts of air are added to the stream of reactivating gases, in the manner previously described, prior to the initial and each successive contact of the gases with the catalytic material. The added air serves to support combustion of the carbonaceous materials deposited on the catalyst and the amount employed controls the rate of oxidation and the temperature attained in the catalyst bed during regeneration.

Since freshly generated hot combustion gases are continuously added to the circulating stream of combustion gases employed as the oxygen carrier and diluent, provision is made for removing the excess of spent combustion gases at a point in the cycle at which the gases are relatively cool. This is accomplished, in the case here illustrated, by means of valve 168 in line 167, this preferably being an automatic pressure control valve of any suitable type by means of which the excess gases are automatically discharged from the cycle and a substantially constant pressure is maintained in the latter.

When series flow of reactivating gases is employed in the catalyst in the reactors of group B as being reactivated, the flow through reactors of this group is the same as that described in conjunction with the reactors of group A with heat exchangers C4 and C3 serving, respectively, to reduce the temperature of the reactivating gases passing from reactor B3 to reactor B2 and from reactor B2 to reactor B1. Controlled quantities of air are added to the stream of gases entering reactors B1, B2, and B3 through lines 184 and valve 185. The spent reactivating gases leaving reactor B1 pass through line 159, valve 161 and line 163 into line 165 wherethrough they are directed, as previously described, to heat exchanger 166 and the succeeding portions of the system, to excess gases, being removed through valve 168.

When parallel flow of reactivating gases is employed and the catalyst in the reactors of group A is being regenerated, combustion gases at the required temperature are directed from line 135 through lines 140, 144 and 148 and the respective valves 142, 146 and 150 into the respective lines 44, 36 and 28 wherein air is added in regulated quantities to the combustion gas streams through lines 184 and valves 185 and the three streams of oxygen-containing gases pass in parallel through the three reactors in each of which they burn carbonaceous materials from the catalyst bed disposed therein and then supply heat to the mass of refractory material.

The spent reactivating gases, partially cooled by supplying heat to the refractory masses in reactors A1, A2 and A3 are directed from these respective zones through lines 160, 156 and 152 and the respective valves 162, 158 and 154 into line 164 wherethrough they are directed to heat exchanges 166, wherefrom the circuit to line 135 is the same as that previously described when series flow through the reactors is utilized and the excess gases being discharged from the circuit through line 167 and valve 168.

With parallel flow of reactivating gases, when the catalyst in the reactors of group B is being reactivated, combustion gases at the desired temperature are directed from line 136 through line 137 and valve 138 and pass from line 137 in three separate streams through lines 139, 143 and 147 and the respective valves 141, 145 and 149 into the respective lines 45, 37 and 29, wherein air from lines 184 is added in regulated quantities to the streams of combustion gases. The three streams pass through reactors B1, B2 and B3 in each of which they first effect combustion of carbonaceous materials deposited in the catalyst beds of these zones and thence pass through the mass of refractory material to supply heat thereto. The resulting spent and partially cooled reactivating gases are directed from reactors B1, B2 and B3 with the respective lines 159, 155, 151 and the respective valves 161, 157 and 153 into line 163 wherefrom they are directed through line 164 to heat exchanger 166 and thence back to line 135, in the manner previously described, the excess relatively cool combustion gases being discharged from the system through valve 168 in line 167.

With either parallel or series flow through the reactors during regeneration, in case the supply of hot products of regeneration to the mass of hot refractory material, in the reactors wherein regeneration has been completed, is not sufficient to fulfill the heat requirements of the hydrocarbon reactants which are passed through the reactors in the subsequent processing period, the circulation of hot combustion gases from the combustion gas generator through the reactors back to the generator, in the manner above described, may be continued for a sufficient length of time to store the required additional heat in the refractory mass. During this period, when employed, the supply of air to the circulating stream or streams of combustion gases may be and is preferably discontinued, since regeneration of the catalyst will have been completed and the added air will serve no useful purpose.

Figure 2:
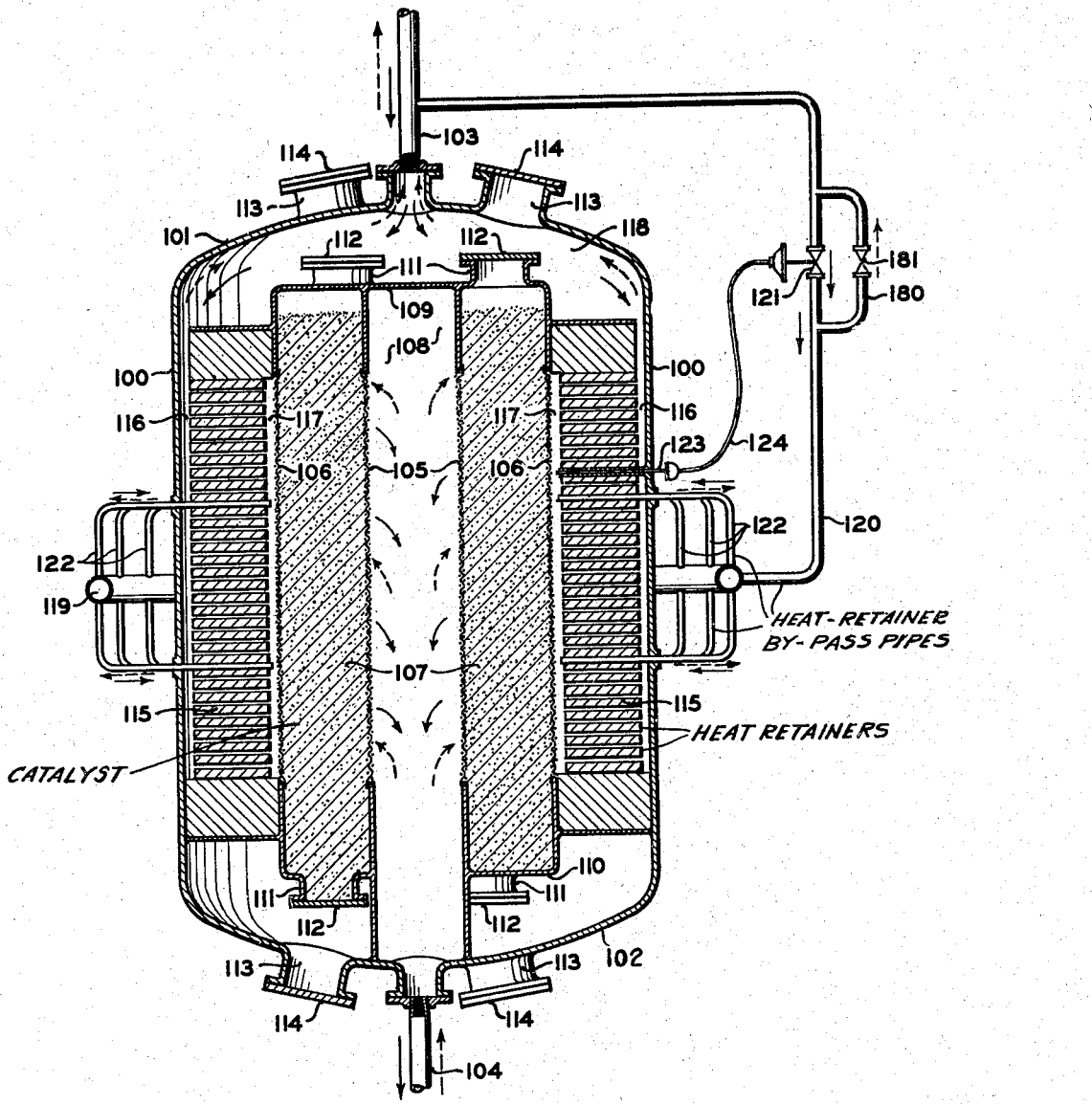
Fig. 2 is a cross-sectional elevation of one specific form of reactor embodying certain advantageous features of the invention and which may be employed to advantage with the process flow illustrated in Fig. 1.

Referring now to Fig. 2, which is a sectional elevation of one specific form of reactor which may be employed in conducting the process of the invention: The cylindrical outer shell 100 of the reactor is closed at the top end and bottom by heads 101 and 102, respectively. A conduit 103 is provided in the top head which, in the case here illustrated, serves as an inlet line for reactants and as an outlet line for spent reactivating gases. A conduit 104 is provided in the bottom head which serves as an outlet line for reactants and/or conversion products and as an inlet line for the hot oxygen-containing gases utilized to reactivate the catalyst.

Concentric spaced screens or grids 105 and 106 are provided in the central portion of the shell and the space provided therebetween is substantially filled with catalytic material indicated at 107. The space 108 enclosed by the inner cylindrical screen 105 is closed at the top by the member 109 which also closes off the upper portion of the space in which the catalyst bed is disposed. Space 108 communicates at its lower end with conduit 104. The lower portion of the space containing the catalyst bed is closed by member 110 and nozzle connections 111 or other suitable openings having removable cover plates 112 and communicating with the space provided between screens 105 and 106 in which the catalyst bed is disposed are provided in the end members 109 and 110, these cover plates and openings being accessible through nozzles or other suitable openings 113 having removable cover plates 114 provided in the top and bottom heads of the reactor, whereby spent catalyst which is no longer susceptible to satisfactory reactivation may be removed from the reactor, when required, and replaced with fresh catalyst.

A bed or mass 115 of refractory material of relatively high heat capacity, such as checkerbrick work, glazed tile shapes, metallic members or the like, the bricks or other individual members of the bed or mass preferably being of low porosity, is provided between the cylindrical outer wall 100 and the outer cylindrical screen 106 and is spaced from each to provide spaces 115 and 117 therebetween. The outer space 116 is closed at the bottom and open at the top to communicate at its upper end with space 118 provided between upper head 101 and member 109, and the inner space 117 is closed at both ends.

A header or conduit 119, communicating with conduit 103 through line 120 having valve 121 disposed therein, is provided about the outer shell of the reactor and branch conduits 122 connect header 119 directly with space 117.

Valve 121 may be manually operated, but preferably is a variable flow type of automatic control actuated in response to the temperature of the materials within space 117 by means of a thermostat or other temperature sensitive device 123 communicating with the valve through line 124.

When conversion is taking place in the reactor of Fig. 2, the flow therethrough, as indicated by the arrows shown in solid lines, is as follows: The stream of hydrocarbon vapors to be converted passes from conduit 103 into space 112. The vapors flood space 116 between outer shell 100 and refractory mass 115 and pass through the latter to space 117 between the refractory mass and the catalyst bed and are heated during their passage through the refractory mass by heat stored within the latter during a previous period of reactivation. The heated vapors pass through screen 106 into and through the catalyst bed 107, wherein their conversion is accomplished and the resulting products pass through screen 105 into space 108 wherefrom they are removed through conduit 104.

Due to the heat given up by the hot refractory mass to the hydrocarbon vapors passing therethrough, the temperature of said mass will decrease as the operation progresses and in order to maintain the temperature of the heated hydrocarbon vapors entering the catalyst bed substantially constant, diminishing quantities of the vapors supplied to the reactor through conduit 103 by-pass the bed of hot refractory material by means of line 120, valve 121, header 119 and lines 122. A small decrease in the temperature of the vapors entering the catalyst bed operates through the temperature sensitive device 123 to restrict the opening through valve 121 and send larger quantities of the vapors through the hot refractory mass. Thus, the temperature of the vapors entering the catalyst bed and the conversion temperature maintained therein is kept substantially constant during the entire processing period.

When the catalyst mass requires regeneration, the flow through the reactor is reversed, as indicated by the arrows shown with broken lines, and oxygen-containing gases are directed through line 104 to space 108 wherefrom they pass through screen 105 into and through the catalyst bed 107, whereby carbonaceous material deposited during the previous processing cycle is burned from the catalyst particles. The resulting hot gases pass through screen 106 into space 117 and thence through the refractory mass 115 to which they give up a substantial portion of their heat and wherefrom they are directed through space 116 and space 118 to conduit 103 through which they are removed from the reactor.

In case the heat available from the hot reactivating gases leaving the catalyst bed is substantially more than that required by the reactants entering the catalyst bed in the subsequent processing period, the by-pass arrangement comprising lines 122, header 119 and line 120 may be employed to divert a regulated portion of the hot regenerating gases past the bed of refractory material in the reactor directly to line 103 and thereby reduce the heat supplied to the refractory mass. To permit this method of operation, a by-pass line 180 having control valve 181 disposed therein is provided around valve 121, valve 121 remaining closed and valve 181 being regulated to suit requirements when regeneration is taking place in the reactor and valve 181 remaining closed while valve 121 is regulated to suit requirements while process of the reactants is taking place in the reactor.

As an example of one specific operation of the process herein provided when catalytically cracking a Mid-Continent gas-oil of approximately 36 to 38° A. P. I. gravity and employing a synthetically prepared alumina-silica catalyst substantially free of alkali metals, the cracking stock consists of approximately one part of said gas-oil and four parts of reflux condensate formed by fractionation of the vaporous conversion products of the process. The raw oil feed rate is approximately 1600 barrels (42 gallons) per stream day, making a total of 8000 barrels of combined feed subjected to cracking per stream day. The combined feed is supplied to heater 15 at a temperature of approximately 720° F., together with approximately 9500 pounds per hour of steam. A superatmospheric pressure of approximately 60 pounds per square inch is employed at the outlet of heater 15 and the temperature at this point is approximately 950° F.

The mixture of heated cracking stock and steam is supplied from heater 15, at substantially the temperature and pressure mentioned, to the first reactor of the group being employed for cracking service and in passing through the previously heated bed of hot refractory material in this zone (the reactors being of the type illustrated in Fig. 2) is further heated to a temperature of approximately 975° F. at which temperature it enters the catalyst bed. There is a temperature drop of approximately 50° in the catalyst bed and the stream of commingled steam and oil vapors leaving the latter is reheated in passing to the next reactor of the series to a temperature of approximately 950° F., the operating conditions in the second and third reactors of the series being the same as the first reactor.

The conversion products are discharged from the third reactor of the series at a temperature of approximately 925° F. and after being cooled by heat exchange with the combined feed to a temperature of approximately 825° F. are supplied to separating and recovery equipment including the fractionator wherein said reflux condensate is formed.

The reactivating gases derived, as previously described, and containing approximately 1.25% of free oxygen supplied to the combustion gas stream as air, are supplied at a temperature of approximately 925° F. to each of the reactors of the group in which the cracking period has been completed after the latter have been purged of hydrocarbon vapors by passing hot oxygen-free combustion gases therethrough. Parallel flow through the reactors is employed during reactivation and the reactivating gases passing through the catalyst bed in each reactor are heated to a temperature of approximately 1150° F. at which temperature they enter the mass of refractory material in each reactor and emerge therefrom at a temperature of approximately 1025° F. They are cooled in heat exchanger 166 to a temperature of approximately 925° F. and a quantity sufficient to maintain a substantially constant superatmospheric pressure in the combustion gas circuit is then discharged from the system. The remaining gases are then scrubbed with water to remove objectionable materials and supplied through heat exchanger 166 to the combustion gas generator wherein they are commingled with a quantity of freshly generated combustion gases sufficient to compensate for the cooled gases removed from the system, this quantity of combustion gases being generated at a temperature sufficient to increase that of the stream of combustion gases being supplied from the generator to the reactors to approximately 925° F.

The above described operation will yield per barrel of raw oil charging stock supplied to the system, approximately 70% by volume of high antiknock gasoline having a Reid vapor pressure of approximately 10 pounds per square inch. Approximately 5% of residual oil, based on the charging stock, is produced and the heavy carbonaceous material deposited on the catalyst amounts to approximately 4% by weight of the charging oil. The remainder is chargeable principally to normally gaseous fractions containing a high concentration of polymerizable olefins. Catalytic polymerization of the heavy olefinic components of these gases will yield an additionally 12% or thereabouts, based on the charging oil, of polymer gasoline which, when blended with the catalytically cracked gasoline, gives an overall yield of approximately 82% of gasoline having an octane number of approximately 80 to 82 (C. F. R.).

We claim as our invention:

1. In a conversion process wherein hydrocarbon reactants are endothermically converted in the presence of a bed of contact material, the supply of said hydrocarbons to said bed being periodically discontinued, while deleterious heavy combustible conversion products deposited in said bed during the conversion reaction are burned therefrom by passing hot oxygen-containing gases in contact therewith, the supply of hydrocarbon reactants to said bed being subsequently renewed and the endothermic conversion reaction therein continued, the improvement which comprises, during the burning step passing hot gases leaving said bed in contact with a mass of refractory material of high heat capacity to store heat in the latter, storing additional heat in said refractory mass prior to the subsequent conversion period by passing therethrough additional hot gases from a source exterior to said bed and, during the subsequent conversion period, passing a portion of the hydrocarbon reactants to be converted in contact with the heated refractory mass prior to their contact with said bed, whereby to supply to said reactants at least a portion of the heat required for effecting said conversion thereof, supplying another portion of said reactants directly to said bed without contacting the same with said hot refractory mass, commingling said portions prior to the introduction of either into said bed, and diminishing the last named portion as the conversion period progresses and as the hot refractory mass is cooled so as to maintain the temperature of the commingled reactants entering said bed substantially uniform during the entire conversion period.

2. In a process for the endothermic conversion of hydrocarbons employing a plurality of beds of contact material, in the presence of which the conversion reaction takes place, passing a stream of the hydrocarbon reactants to be converted successively through said beds, periodically discontinuing the supply of said hydrocarbons to said beds and burning from the latter deleterious heavy combustible conversion products deposited therein during the conversion reaction by passing a stream of hot oxygen-containing gas successively through said beds, subsequently renewing the supply of hydrocarbon reactants to said beds and continuing the endothermic conversion reaction therein, during the burning step passing hot gases leaving each bed in contact with a mass of refractory material of high heat capacity to store heat in the latter prior to passing said gas stream in contact with the next successive bed, adjusting the temperature and oxygen content of said gas stream to the desired value prior to each successive contact thereof with said beds, storing additional heat in said refractory masses prior to the subsequent conversion period by passing therethrough additional hot gases from a source exterior to said beds, and during the subsequent conversion period passing hydrocarbon reactants to be converted in contact with one of the heated refractory masses prior to each successive contact thereof with said beds, whereby to supply to said reactants at least a portion of the heat required for effecting said conversion thereof.

3. In a catalytic cracking process wherein hydrocarbon reactants to be cracked are passed in contact with a bed of cracking catalyst disposed in a reaction zone wherein said cracking reaction is conducted, the supply of said hydrocarbons to said bed being periodically discontinued while deleterious heavy combustible conversion products deposited in said bed during the cracking reaction are burned therefrom to regenerate the catalyst by passing hot oxygen-containing gas in contact therewith, the supply of hydrocarbon reactants to the regenerated bed being subsequently renewed and the cracking reaction therein continued, the improvement which comprises, during said regenerating step passing hot gases leaving said bed in contact with a mass of refractory material of high heat capacity to store heat in the latter, storing additional heat in said refractory mass prior to the subsequent cracking step by passing therethrough additional hot gases from a source exterior to said bed, and during the subsequent cracking period passing a portion of the hydrocarbon reactants to be converted in contact with the heated refractory mass, supplying another portion thereof directly to said catalyst bed without contacting the same with said hot refractory mass, commingling said portions prior to the introduction of either into the catalyst bed, and diminishing the last named portion as the cracking period progresses and as the hot refractory mass is cooled so as to maintain the temperature of the commingled reactants entering the catalyst bed substantially uniform during the entire cracking period.

4. In a catalytic dehydrogenating process wherein hydrocarbon reactants to be dehydrogenated are passed in contact with a bed of dehydrogenating catalyst disposed in a reaction zone wherein said dehydrogenating reaction is conducted, the supply of said hydrocarbons to said bed being periodically discontinued, while deleterious heavy combustible conversion products deposited in said bed during the dehydrogenating reaction are burned therefrom to regenerate the catalyst by passing hot oxygen-containing gases in contact therewith, the supply of hydrocarbon reactants to the regenerated bed being subsequently renewed and the dehydrogenating reaction therein continued, the improvement which comprises, during said regenerating step passing hot gases leaving said bed in contact with a mass of refractory material of high heat capacity to store heat in the latter, storing additional heat in said refractory mass prior to the subsequent dehydrogenating step by passing therethrough additional hot gases from a source exterior to said bed, and during the subsequent dehydrogenating period passing a portion of said hydrocarbon reactants in contact with the heated refractory mass, supplying another portion thereof directly to the catalyst bed without contacting the same with said hot refractory mass, commingling said portions prior to the introduction of either portion into the catalyst bed, and diminishing the last named portion as the dehydrogenating period progresses and as the hot refractory mass is cooled so as to maintain the temperature of the commingled reactants entering the catalyst bed substantially uniform during the entire dehydrogenating period.

PERCY MATHER.
LEV A. MEKLER.